United States Patent
Walters et al.

(10) Patent No.: US 6,307,997 B1
(45) Date of Patent: Oct. 23, 2001

(54) TERMINATION BLOCK FOR OPTICAL FIBER CABLES

(75) Inventors: Mark D. Walters, Azle; Robert W. Dennis, Haltom City; John David Harvey, Trophy Club, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/378,446

(22) Filed: Aug. 20, 1999

(51) Int. Cl.[7] .................................................. G02B 6/00
(52) U.S. Cl. ............................................. 385/134; 385/59
(58) Field of Search ................................. 385/53, 58, 59, 385/134, 135

(56) References Cited

U.S. PATENT DOCUMENTS

| 4,712,232 | 12/1987 | Rodgers | 379/329 |
|---|---|---|---|
| 5,274,722 | 12/1993 | Saitoh et al. | 385/78 |
| 5,274,729 | * 12/1993 | King et al. | |
| 5,399,109 | 3/1995 | Sedig | 439/701 |
| 5,458,503 | 10/1995 | Below | 439/404 |
| 5,647,763 | 7/1997 | Arnold et al. | 439/540.1 |
| 5,659,650 | 8/1997 | Arnett | 385/135 |
| 5,724,467 | * 3/1998 | VandenEnden et al. | |
| 6,077,113 | 6/2000 | Lecomte | 439/540.1 |

FOREIGN PATENT DOCUMENTS

0859526A1    8/1998    (EP) ................. H04Q/1/14

* cited by examiner

Primary Examiner—Hung N. Ngo

(57) ABSTRACT

Devices and methods by which fiber optic connectors, and the adapters associated with them can be installed upon mounting surfaces. A termination block is described that retains a number of adapters to receive fiber optic cable connectors for interconnection and/or cross-connection with other connectors or switching equipment. The termination block has a mounting footprint that is substantially identical to the mounting footprint of an electrical punch-down block, thus permitting ease of retrofitting. Slider panels are retained within bays in a base unit to secure adapters within the base unit. The slider panels are individually moveable so that each can be slidingly withdrawn from its bay for better access to the adapter secured therewithin. In preferred embodiments, removable markers are affixed to individual slider panels and a removable cover is provided for the termination block. Methods for mounting and retrofitting termination blocks are also described.

20 Claims, 11 Drawing Sheets

TERMINATION BLOCK FOR OPTICAL FIBER CABLES

BACKGROUND

The present invention is directed to devices that receive optical fiber cable connectors and permit them to be interconnected and cross-connected with other optical fiber connectors.

When office buildings and other structures receive incoming telecommunication lines, an interface is needed to receive the incoming lines and interconnect them with switching equipment associated with the building. Heretofore, incoming telecommunication lines have consisted of cables formed of copper wires that connect electrically with the switching equipment in the building. A typical interface consists of mounted "punch-down blocks" that receive the copper wires of the cables within V-shaped grooves to establish an electrical connection. Standard punch-down block designs are commonly referred to as type 66 and type 110 punch-down blocks. These devices have distinctive "footprints" that permit them to be readily installed into standard panels or spaces for installation of these racks.

As fiber optic-based communications have developed, it has become apparent that there is a need to be able to retrofit office buildings and other structures so that they can receive and make use of telecommunication lines made up of fiber optic cables. Up until now, those who have dealt with the problem of installing fiber optic-based cables in office buildings for telecommunications have had to install the connectors and associated adapters in fixed or sliding panels that were most often enclosed in sheet metal housings.

Recently, an optical distribution frame was developed that permits adapters for optical connection to be affixed within drawers in a storage rack. While this arrangement provides clear advantages over the use of metal housings, it is not ideal in every instance. First, shelves are used to mount these adapters, and these shelves must be individually withdrawn from the utility rack in order to access the adapters. Additionally, the utility rack is large—around seven feet tall—and requires room adjacent the rack so that the drawers can be withdrawn from the rack.

It would be an improvement to have a termination block that is compact and can be easily installed in a small area. It would also be an improvement to have a termination block that can be readily and easily substituted for standard copper electrical conduit punch-down blocks, for example, by providing the same or substantially the same footprints as the punch-down blocks.

SUMMARY OF THE INVENTION

The present invention provides devices and methods by which fiber optic connectors, and the adapters associated with them can be easily installed upon panels, walls, or other mounting surfaces. A termination block is described that retains a number of adapters to receive fiber optic cable connectors for interconnection and/or cross-connection with other connectors or switching equipment. The termination block has a mounting footprint that is substantially identical to the mounting footprint of an electrical punch-down block, thus permitting ease of retrofitting. The modular termination block also has a low production cost in comparison to prior art devices and arrangements.

In an exemplary described termination block, slider panels are retained within bays in a base unit to secure adapters within the base unit. The slider panels are individually moveable so that each can be slidingly withdrawn from its bay for better access to the adapter secured therewithin. In preferred embodiments, removable markers are affixed to individual slider panels and a removable cover is provided for the termination block. Methods for mounting and retrofitting termination blocks are also described.

DETAILED DESCRIPTION OF THE INVENTION

Figure 1:
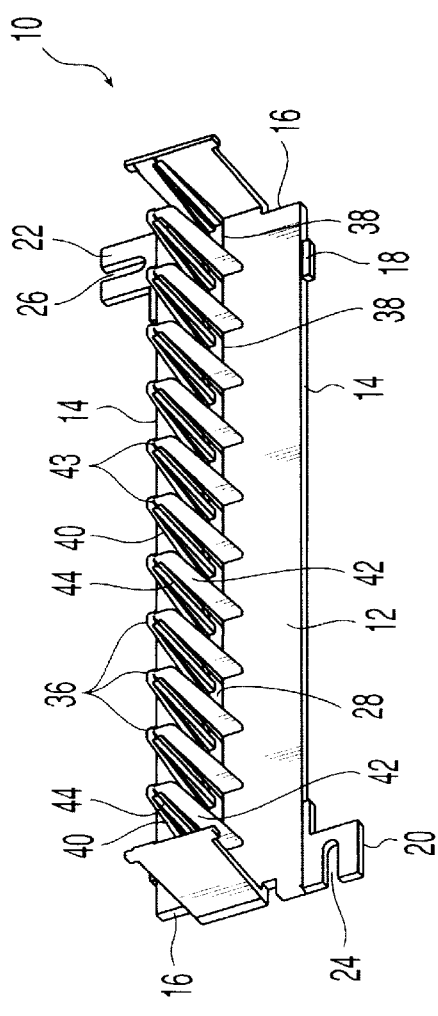
FIG. 1 is an isometric view of a base unit used in the termination block of the present invention.
Figure 2:
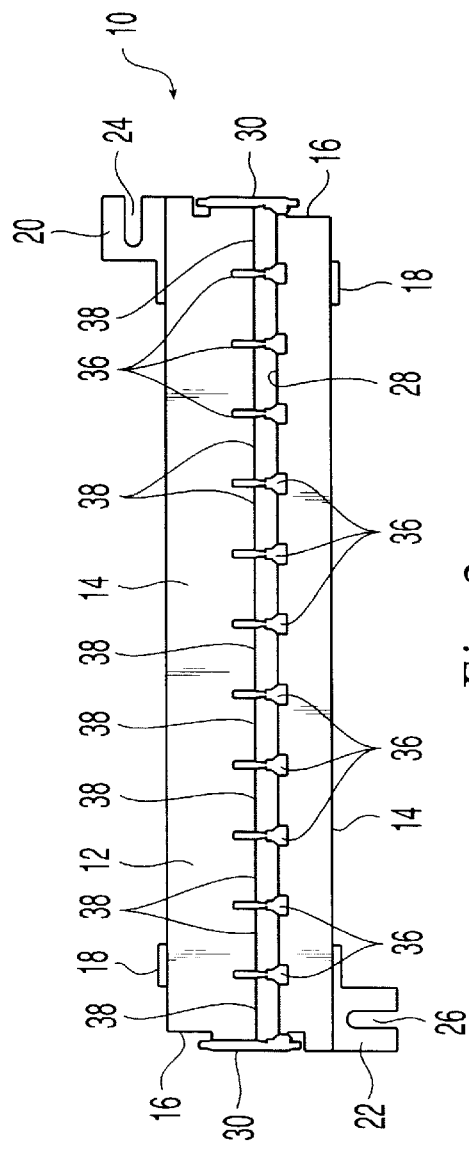
FIG. 2 is a plan view of the base unit depicted in FIG. 1.

Some of the devices constructed in accordance with the present invention are referred to herein as "termination blocks" because they are useful for receiving the terminal ends of external fiber optic communication and/or data conduits. Referring first to FIGS. 1 and 2, an exemplary base unit 10 is shown that is used in forming a termination block. The base unit 10 is also visible in FIGS. 3–12. The base unit 10 has a flat, substantially rectangular lower platform 12 that is elongated to provide longitudinal sides 14 and ends 16. Currently preferred dimensions for the platform 12 are approximately 25 cm in length and approximately 5 cm in width to substantially match the size of a standard mounting block for electric cables such as the S66M1-50 block (or "66-block") available from The Siemon Company. It is noted that the platform 12 might also be constructed to have the same dimensions as the S110M1-50 punch-down block (or "110-block").

The longitudinal sides 14 present a rectangular tabs 18 and connector brackets 20,22 that extend outwardly from the sides 14. The tabs 18 and the connector brackets 20,22 are used to secure the base unit 10 to a mounting surface such as a wall or panel. The dimensions of the platform 12 and the presence of the tabs 18 and connector brackets 20,22 define a mounting footprint for the base unit 10.

The two tabs 18 are identical. The connector brackets 20 and 22, however, are dissimilar in construction. The first connector bracket 20 has an aperture 24 disposed within it in a longitudinal direction while the connector bracket 22 has an aperture 26 disposed within it in a lateral direction. A slot 28 is cut along the majority of the length of the platform 12.

Each end 16 of the platform 12 has an end panel 30 that lies flush with the end 16 and extends vertically upwardly from the platform 12. The end panels 30 have vertically oriented retaining grooves 32 disposed within them. The upper end of each end panel 30 also has a pair of outwardly extending ears 34.

Between the end panels 30, a plurality of brackets 36 are positioned in a spaced relation from one another. The brackets 36 extend upwardly from the platform 12, thereby defining a series of bays 38 therebetween. Bays 38 are also formed between the brackets 36 and the end panels 30. The brackets 36 are formed by a pair of legs 40, 42 that are affixed to the platform 12 on either side of the slot 28 and joined to one another at their highest point 43. A vertically oriented slot 44 is defined between the legs 40, 42 of each of the brackets 36 below the point of joining 43. The vertical slots 44 are aligned with the slot 28 within the platform 12. As will be described shortly, the brackets 36 retain a plurality of slider panels 50.

Figure 3:
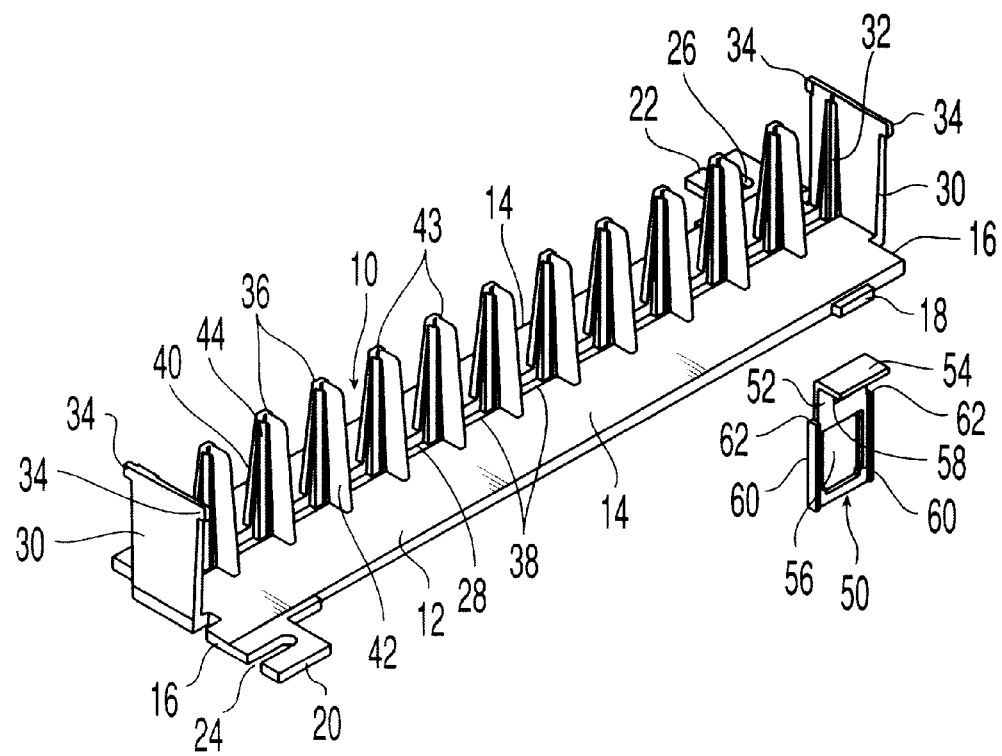
FIGS. 3 and 4 are isometric views illustrating insertion of a slider panel into the base unit of FIGS. 1 and 2.
Figure 4:
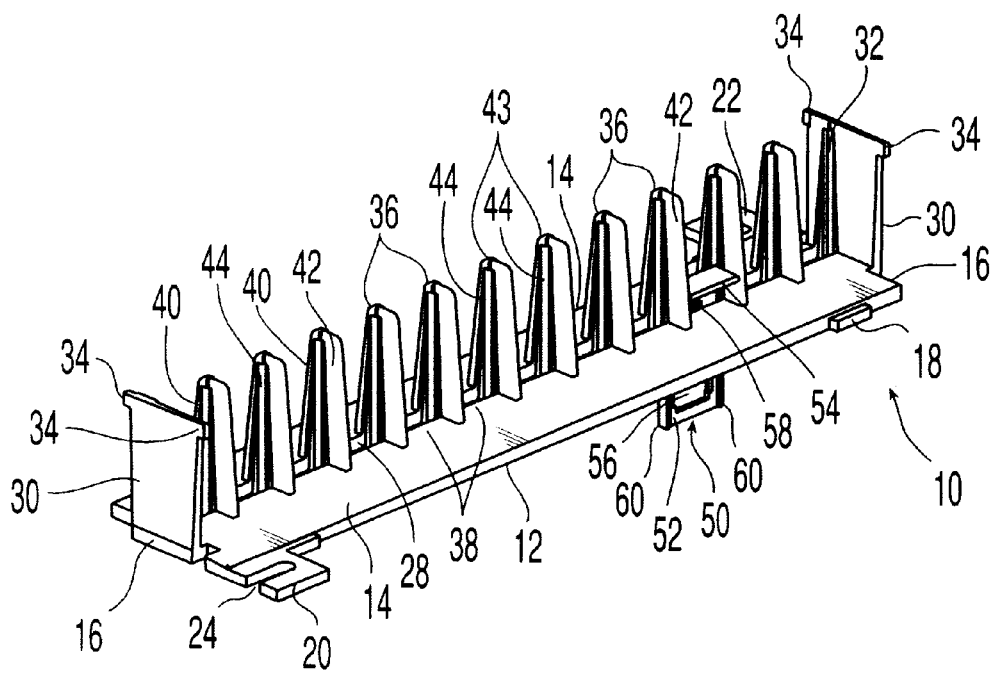
Figure 7:
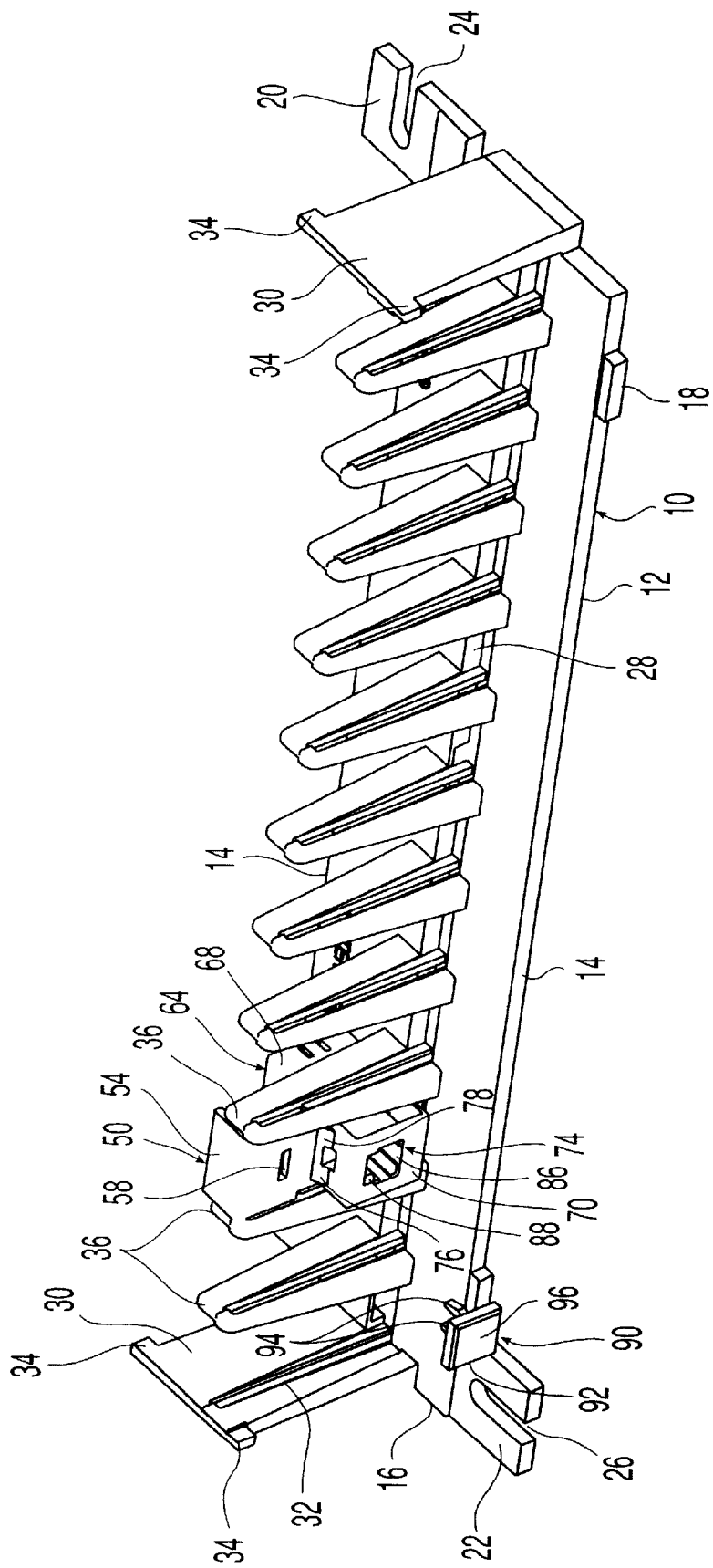
FIGS. 7 and 8 are isometric views depicting attachment of a removable marker to the slider panel.

Referring now to FIGS. 3 and 4, the insertion of an exemplary slider panel 50 into a bay 38 of the base unit 10 is shown. The slider panel 50 is formed from a vertically oriented plate 52 and a horizontally oriented top plate 54. The upper surface of the top plate 54 provides a convenient surface for writing or the placement of markings or other indicia, such as labels for identification of particular cable connections. The vertical plate 52 is essentially a flat rectangular member that contains a large aperture 56 and a smaller aperture 58 that is best seen in FIG. 7. The top plate 54 provides a finger lift for the slider panel 50 so that the panel 50 may be lifted and slidingly withdrawn from its bay 38.

The lateral sides of the vertical plate 52 have slider portions 60 that are sized and shaped to fit within the vertical slot 44 of a bracket 36 or the groove 32 in an end panel 30. A shoulder 62 is provided at the upper end of each slider portion 60. It is pointed out that the slider panels 50 are shaped and sized to fit within the bays 38 of the base unit 10.

As can be seen by reference to FIGS. 3–5, the slider panels 50 are disposed below the platform 12 and slidingly inserted from the lower side of the base unit 10 through the slot 28 and into the individual bays 38. This method of insertion is particularly advantageous since it will be difficult to inadvertently remove a slider panel 50 from its bay 38 once the base unit 10 has been secured to a mounting surface.

Figure 5:
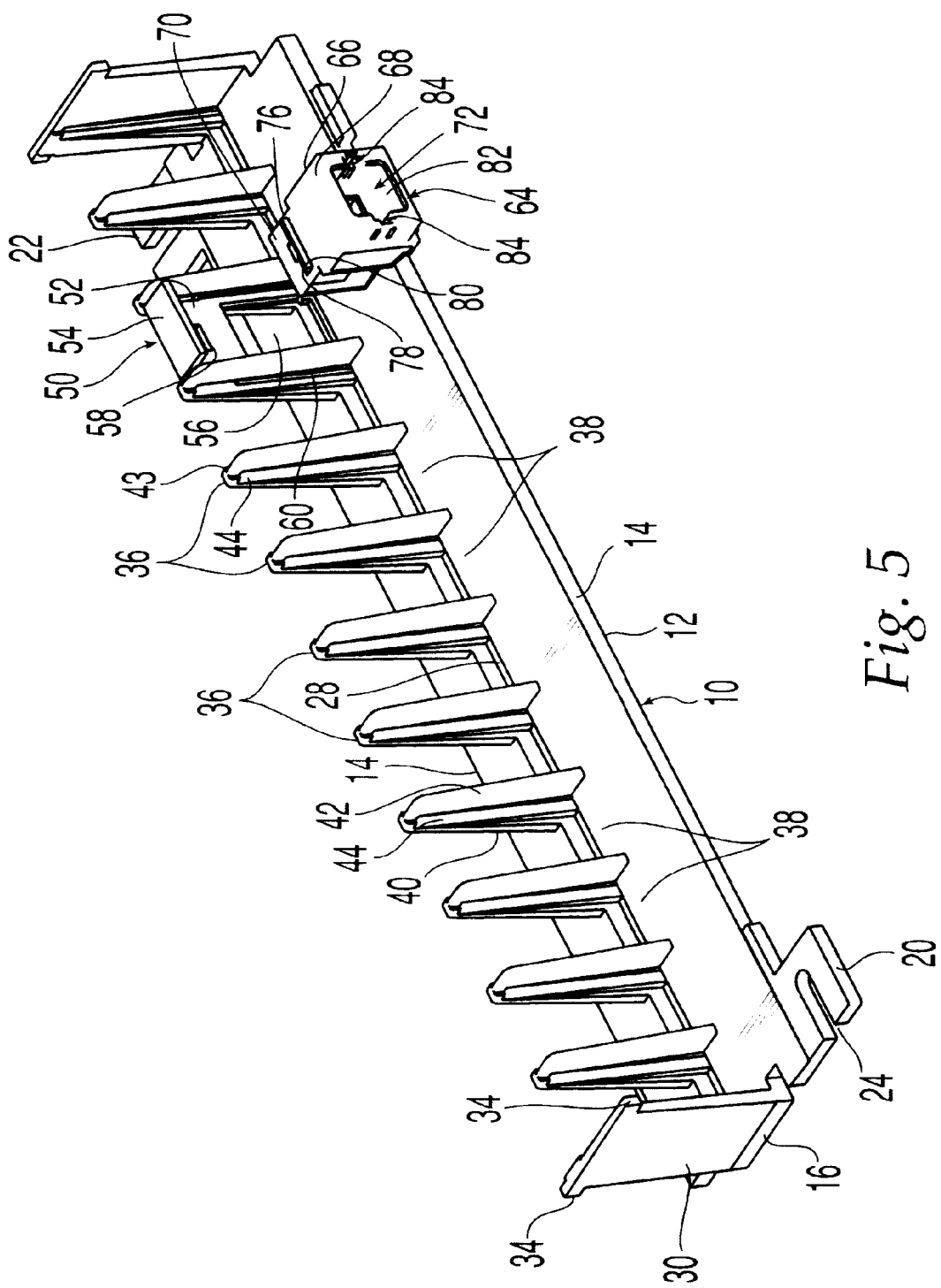
FIGS. 5 and 6 are isometric views showing insertion of an adapter into a slider panel.
Figure 6:
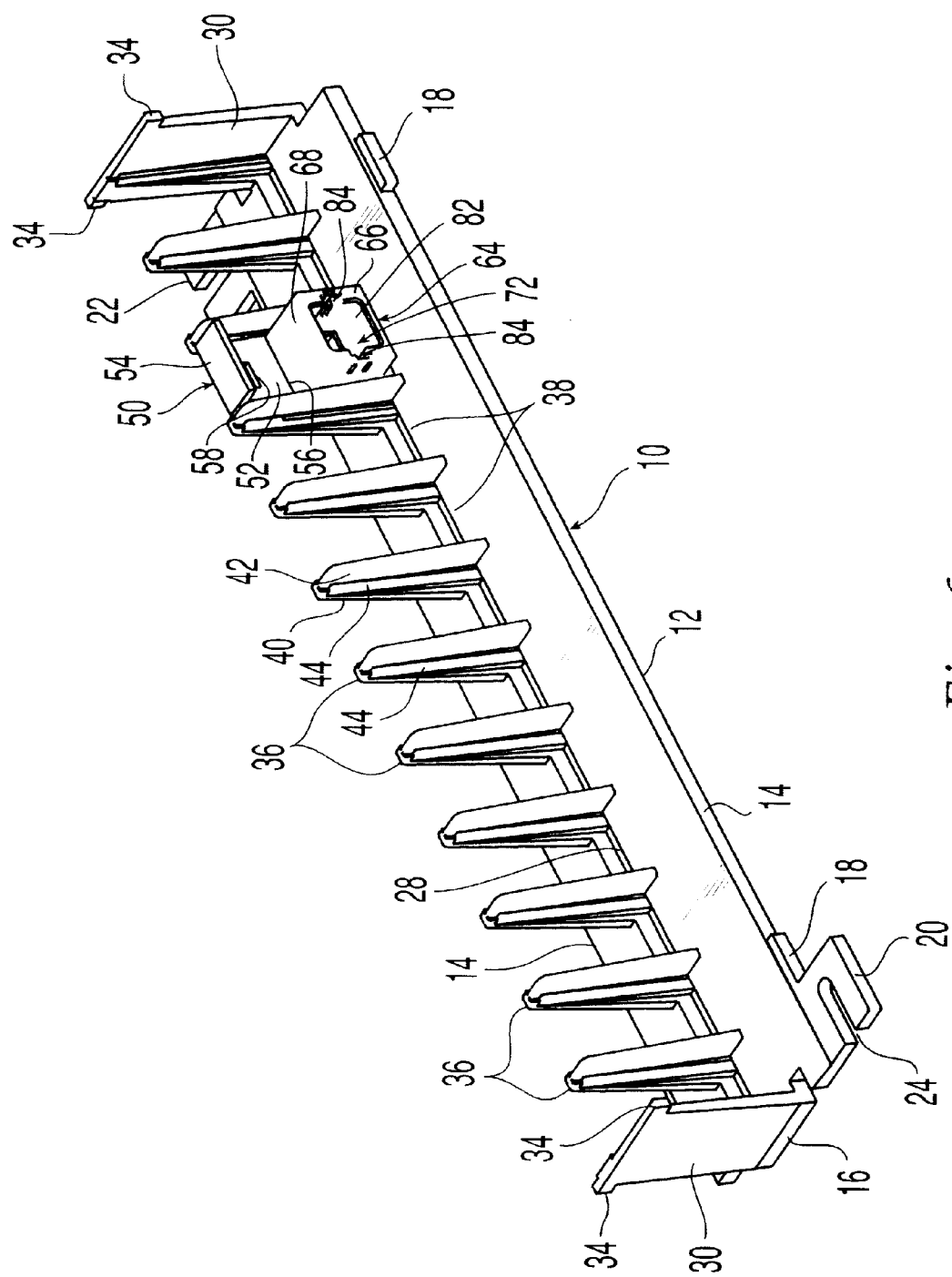

Referring now to FIGS. 5, 6 and 7, an adapter 64 is shown being disposed within the large aperture 56 of the slider panel 50. The adapter 64 has an outer, block-like housing 66 having an enlarged portion 68 at one end and a smaller portion 70 at the other end. An enlarged receptacle 72 (as illustrated in FIGS. 5–7) is disposed in the enlarged portion 68 (see FIGS. 5 and 6), and a smaller receptacle 74 is disposed in the smaller portion 70 (see FIGS. 7, 8 and 9). It is noted that the adapter 64 may be configured, if desired, to receive MT-RJ connectors or another type of connector on both or either of its ends. Although not shown, it should be understood that the adapter 64 defines a passage therein between the two receptacles 72, 74 so that transmitted light may pass entirely through the adapter 64.

The smaller portion 70 of the housing 66 is shaped and sized to be slidingly inserted into the large aperture 56 of the slider panel 50. The upper side of the smaller portion 70 presents an outwardly protruding tab 76 having a slanted, forward-facing cam surface 78 and a vertically-oriented, rearward-facing stop face 80. The lower side of the housing 66 is also provided with a hinged or cantilevered latch (not shown) of a type known in the art that can be depressed to facilitate sliding insertion of the smaller portion 70 of the housing 66 into the large aperture 56. FIGS. 5–7 illustrate this sliding insertion. When inserted, the upper edge of the large aperture 56 slips over the cam face 78 of the tab 76 so that the adapter 64 is retained within the large aperture 56. Contact by the stop face 80 with the edge of the large aperture 56 prevents the adapter 64 from being easily removed from the aperture 56.

The enlarged receptacle 72, as shown in FIGS. 5 and 6, is shaped and sized to receive and retain a FirstLink™ connector. As FIGS. 5 and 6 show, the enlarged receptacle 72 has a main entrance portion 82 and a pair of key ways 84 located on either lateral side of the main entrance portion 82, these being formed to receive portions of a FirstLink connector when that connector is seated therein.

The smaller receptacle 74 is shaped and sized to receive and retain a standard MT-RJ connector of the type commonly used on the end of an optical fiber cable. The receptacle 74 also has a main entrance portion 86 for reception of the body of an MT-RJ connector and a single key way 88 located on the upper side of the main entrance portion 86 that receives the key and latch of an MT-RJ connector. The construction and operation of MT-RJ and FirstLink-style connectors and receptacles for receiving them are well understood and, therefore, will not be described in any detail here.

Figure 8:
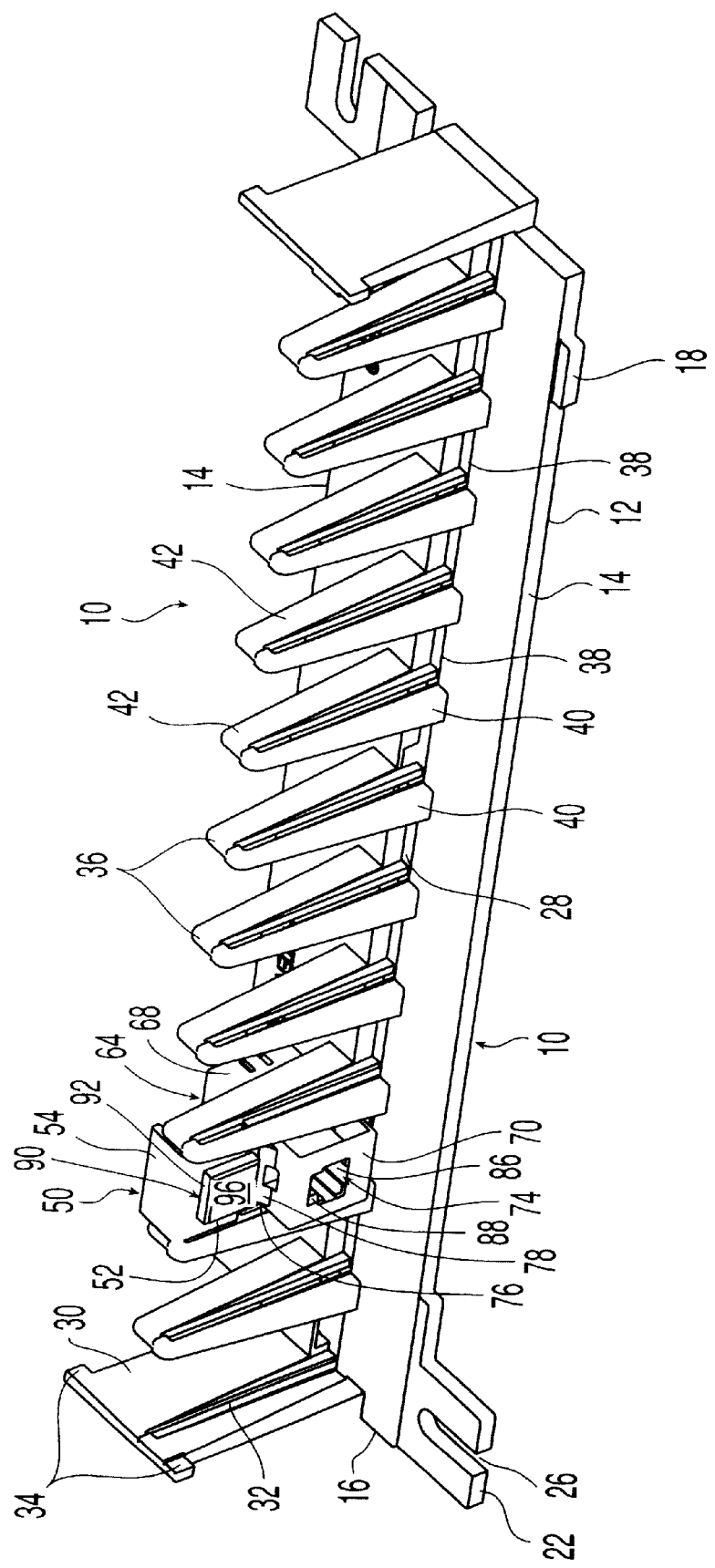

FIGS. 7 and 8 depict the attachment of a removably affixable marker 90 to a slider panel 50. The marker 90 is used to affix a particular symbol, word, numeral, icon or other indicia to the slider panel 50. For example, a marker might carry the symbol for a telephone (see FIG. 9) indicating that optical fiber cables connected through that particular slider panel are used for transmitting telephone communications. The exemplary marker 90 shown in FIGS. 8 and 9 has a panel 92 with a pair of attachment prongs 94 (visible in FIG. 7) affixed thereto. The panel 92 provides a surface 96 for the placement of a desired indicia. The indicia might be placed upon the surface 96 by stamping, engraving, writing, labeling or by other techniques.

The marker 90 is affixed to a slider panel 50 by disposing the prongs 94 within the smaller aperture 58 to provide an interference fit between the components. If it is desired to remove the marker 90, the marker 90 is pulled outwardly to remove the prongs 94 from the aperture 50. Because the marker 90 can be removed and replaced with another marker, remarking of the slider panels 50 is a simple matter.

Figure 9:
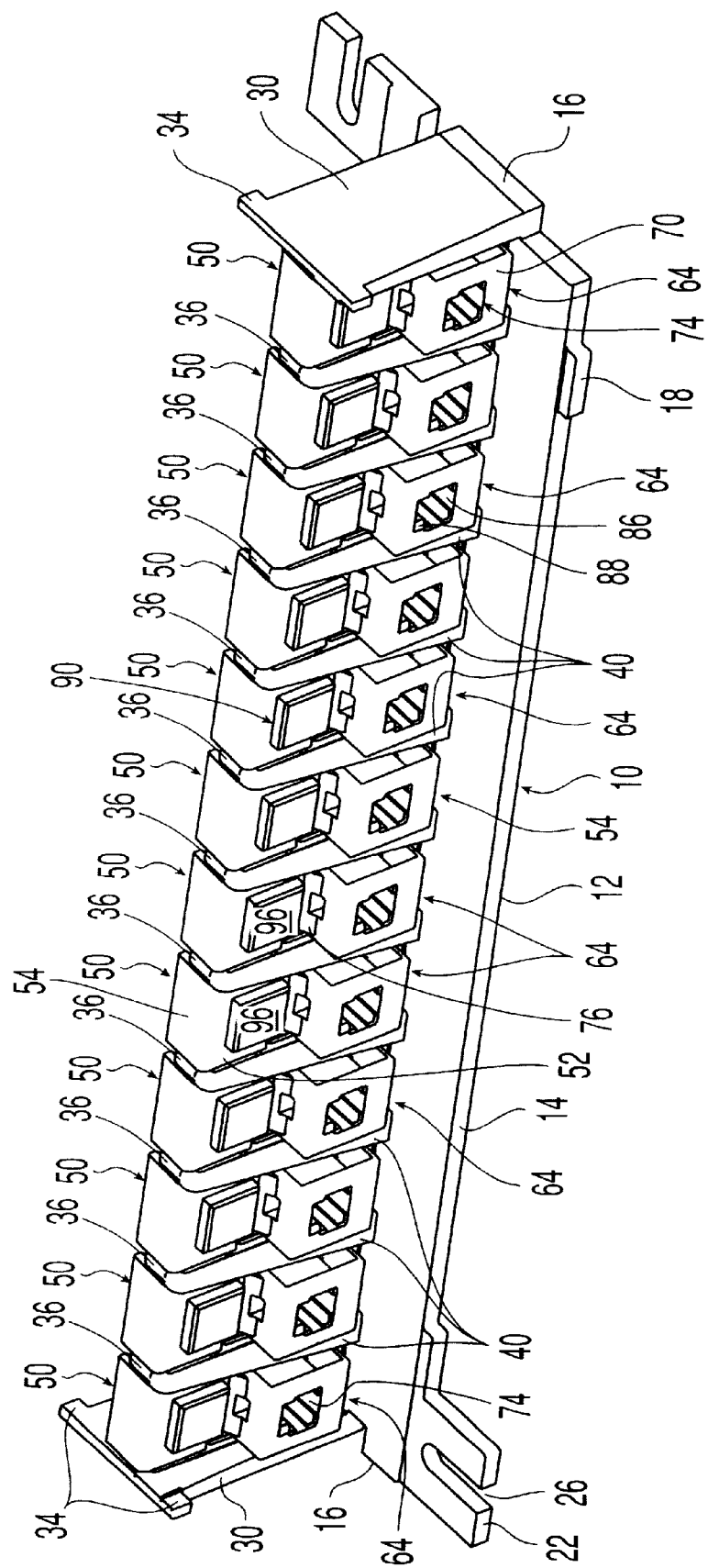
FIG. 9 is an isometric view of an exemplary base unit having a plurality of slider panels and adapters installed.

The above-described operations can be repeated in order to install other slider panels 50, adapters 64 and markers 90 in each or some of the bays 38 of the base unit 10. FIG. 9 shows a slider panel 50 and an adapter 64 present in each of the bays 38 of the base unit 10. Those of skill in the art will understand that it the adapters 64 may be inserted within the slider panels 50 either before or after the base unit 10 has been affixed to a support surface as will be described shortly.

Figure 11:
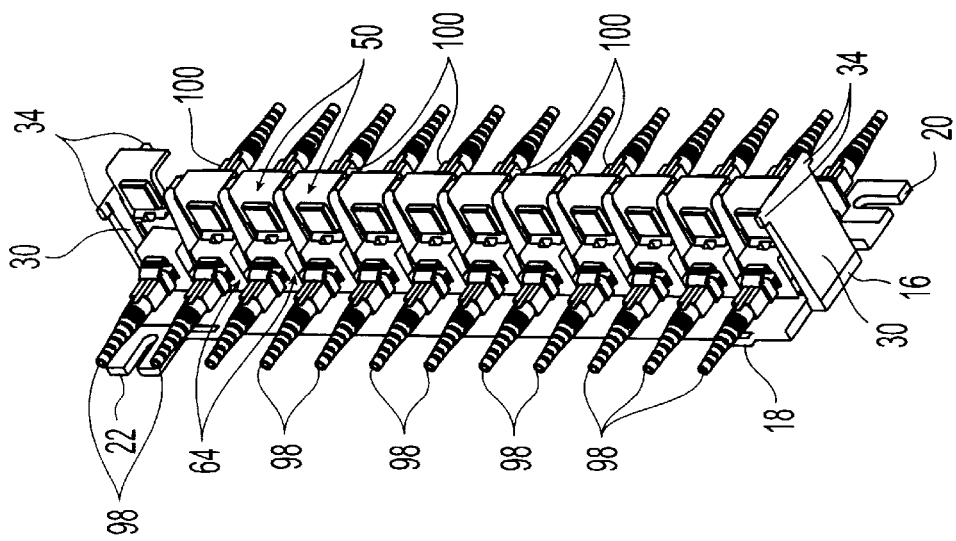
FIGS. 10 and 11 are isometric views of the assembly depicted in FIG. 9 having a plurality of fiber optic connectors installed therein.
Figure 10:
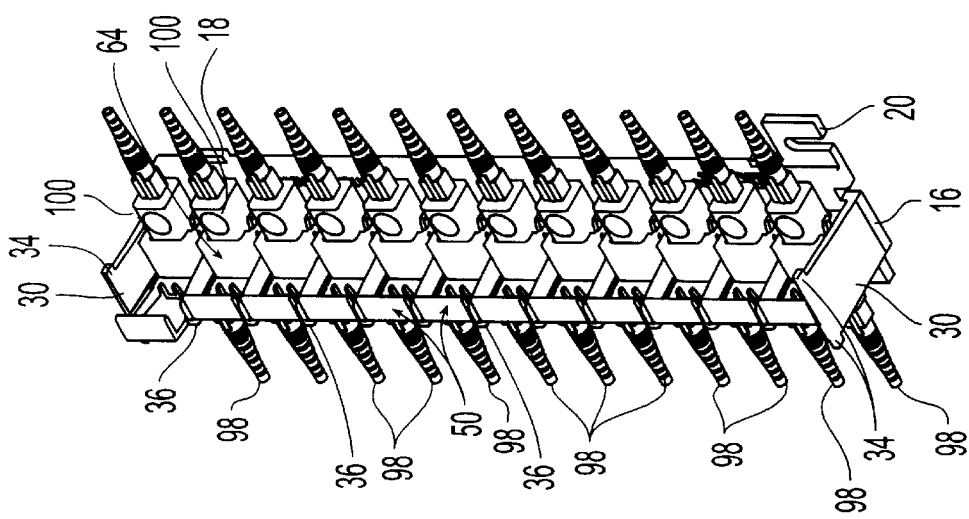

Referring now to FIGS. 10 and 11, a plurality of standard MT-RJ connectors 98 are shown disposed within the smaller receptacles 74 of the smaller portion 70 of the adapters 64. Although not shown, it will be understood that each of the connectors 98 is affixed to the end of an optical fiber cable. A plurality of connectors 100, the illustrated connectors being FirstLink connectors, are disposed within the larger receptacles 72 of the larger portion 68 of the adapters 64.

As depicted in FIGS. 10 and 11, the slider panels 50 can be pulled upwardly and slidingly withdrawn from the bays 38 to provide better access to the adapter 64 and the connectors inserted within it. Upward movement of the slider panel 50 is halted when the shoulders 62 of the slider portions 60 contact the joined portion 43 of the brackets 36.

Figure 12:
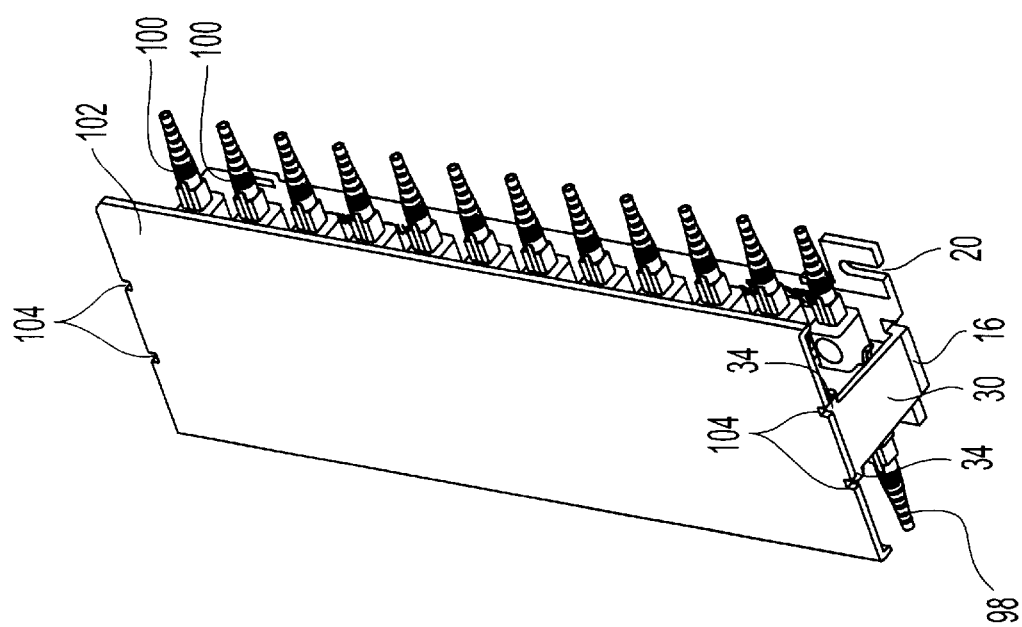
FIG. 12 shows use of an exemplary cover with the assembly shown in FIGS. 10 and 11.

FIG. 12 illustrates the placement of a removable cover 102 onto the base unit 10. The cover 102 is provided with a pair of notches 104 at either longitudinal end which are sized and shaped to retain the ears 34 of the end panels 30, such retention removably securing the cover 102 to the base unit 10. The cover 102 serves the function of protecting the adapters 64, connectors 98 and associated components from dust and other contaminants. The cover 102 is also useful to provide a clean and neat appearance by concealing the connectors and other components from view as well providing a convenient surface for marking or labeling.

Figure 13:
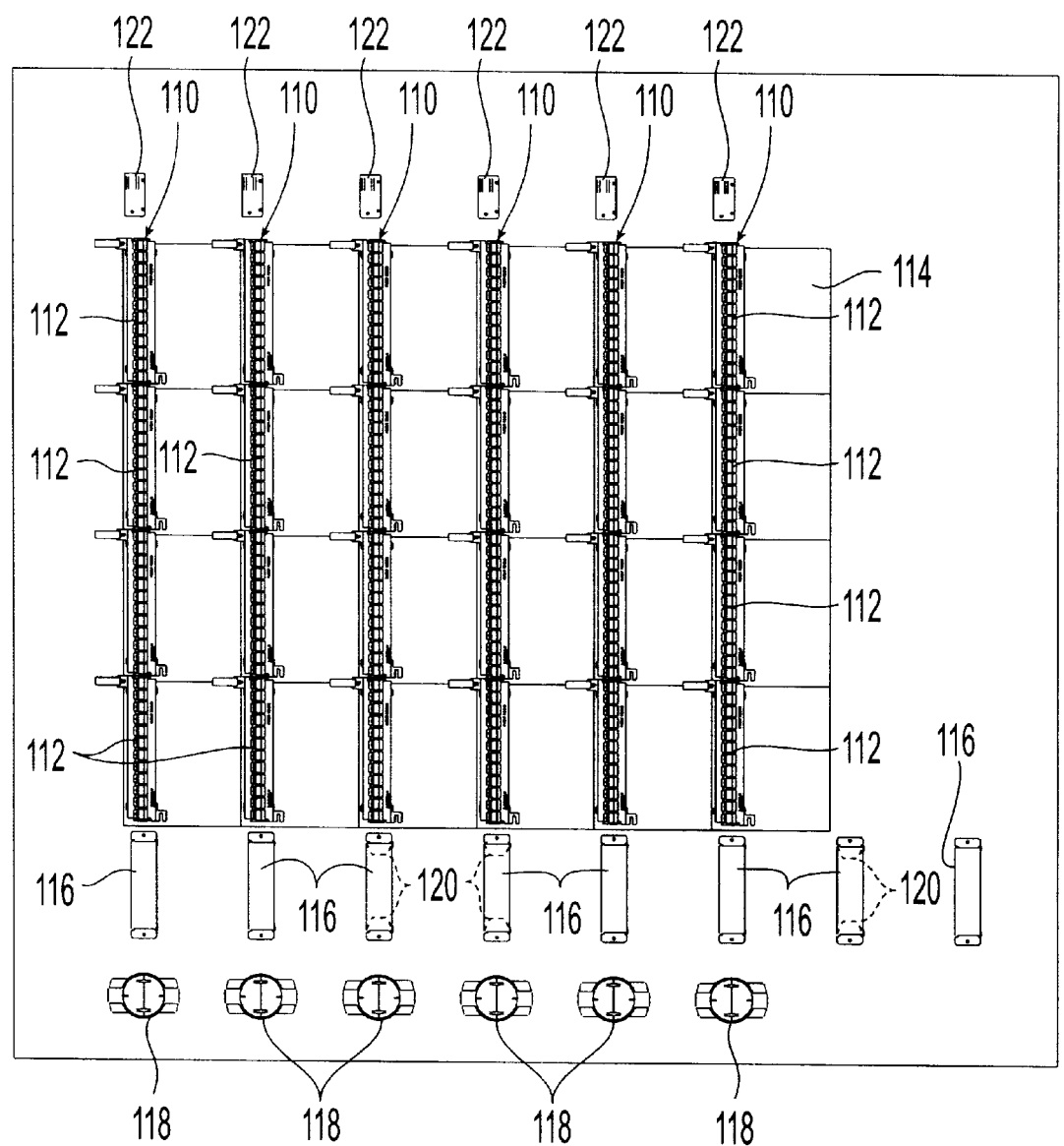
FIG. 13 depicts an exemplary mounting arrangement for a plurality of connection blocks.
Figure 14:
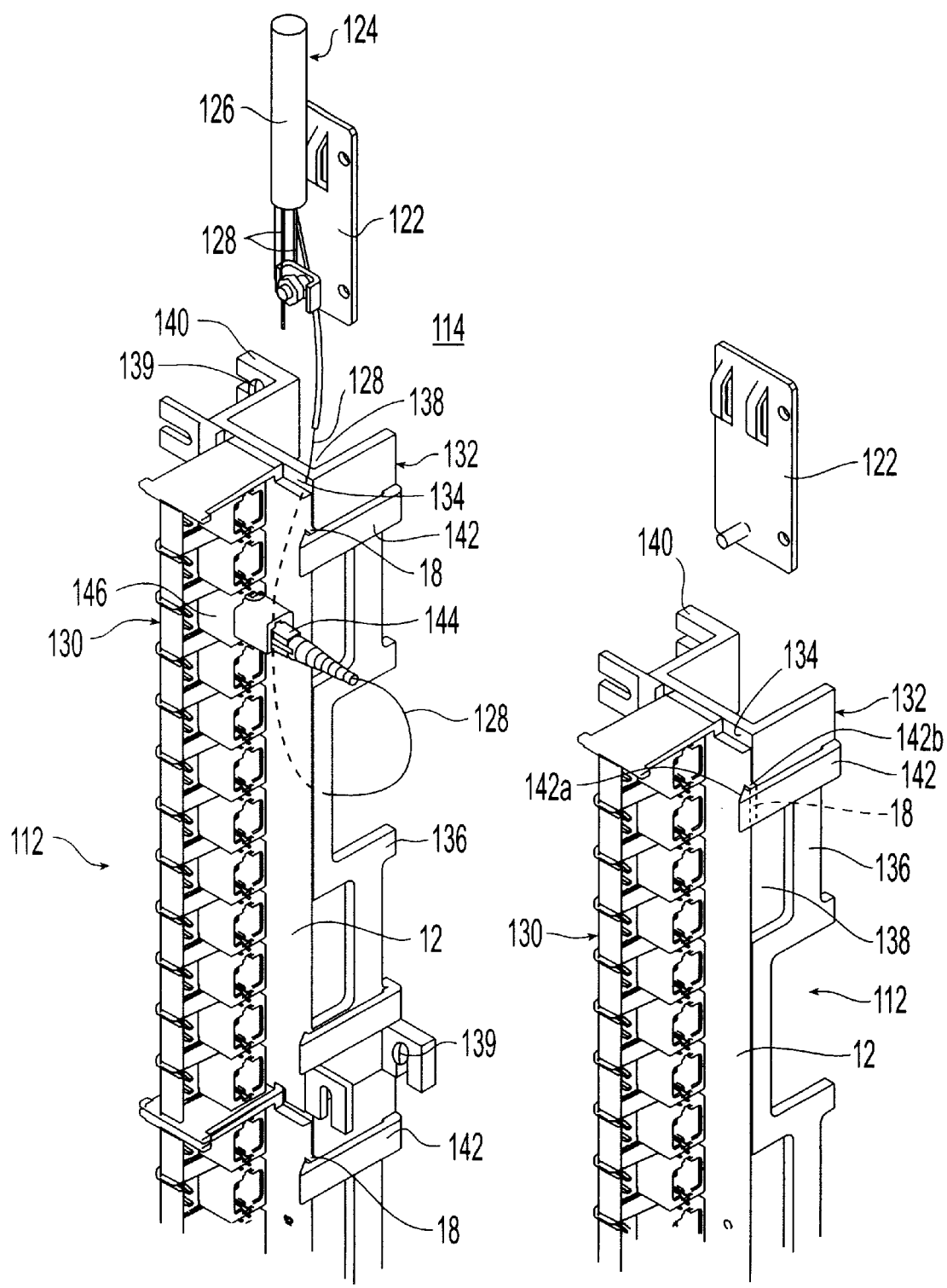
FIG. 14 is a closer view of a portion of a column of connection blocks.

Termination blocks of the type described above may be installed in an equipment rack, in a frame, or directly to a wall or other mounting surface. Referring now to FIGS. 13 and 14, features of an exemplary mounting and/or retrofitting process are described. It is a feature of the invention that the termination block apparatus is capable of easily replacing a standard punch-down block, such as the S66M1-50 block. Since the exemplary termination block has substantially the same mounting dimensions as the standard 66-type copper punch-down block, it may be used in most any mounting configuration, using the same mounting accessories, as the punch-down block.

FIG. 13 depicts an exemplary wall type mounting arrangement wherein several columns 110 of optical fiber retainer assemblies 112 are affixed to a wall or other flat surface 114. Six exemplary columns 110 of retainer assemblies 112 are illustrated. In each column 110, four retainer assemblies 112 are aligned in an end-to-end relation along the wall 114. At the lower end of each column 110 of retainer assemblies 112, an optical fiber "D-ring" bracket 116 and a slack storage hub 118 are mounted. It is noted that the D-ring bracket 116 has upper and lower connecting portions (see FIG. 14) that present arcuate inner surfaces 120 shaped to have a sufficiently large radius to ensure that an optical fiber following the contour of the surface 120 is not bent beyond its critical bend radius. Above each of the columns 110, a strain-relief bracket 122 is mounted for securely holding a bundled optical fiber cable.

Although not shown, it should be understood that, prior to affixing the retainer assemblies 112 in the pattern shown, copper cable punch-down blocks and associated equipment were removed from the surface 114. The punch-down blocks provided the same mounting footprint as the retainer assemblies 112 and were arranged in the column pattern shown in FIG. 13. Also, standard copper cable D-rings (not shown) were removed and replaced with the optical fiber D-rings 116 described above. Standard D-rings used with copper cable are generally unsuitable for use with optical fibers because they provide small, narrow engagement portions, and an optical fiber contacting those portions will be easily bent beyond its critical bend radius, thereby impairing or destroying the ability of the optical fiber to transmit light. Once the punch-down blocks have been removed and the copper cable D-rings replaced with optical fiber D-rings 116, the columns 110 of connector retainer assemblies 112 are installed in the arrangement shown.

FIG. 14 is a closer view of the upper portions of two of the columns 110. As shown there, a bundled optical fiber cable 124 extends downward along the wall 114. The bundled cable 124 has an outer sheath 126 that covers a plurality of two-fiber cables 128. The optical fiber connector retainer assemblies 112 each include a termination block 130 of the type described earlier having base unit 10. In the illustrated embodiment, the retainer assemblies 112 also include a stand-off frame 132 of a type known in the art.

The stand-off frame 132 provides an upper mounting surface 134 and apertured sides 136 that define a space 138 beneath the mounting surface 134. The apertured sides 136 of the frame 132 permit cables 128 to pass beneath the mounting surface 134. The stand-off frames 132 are affixed to the wall 114 by screws 139 that pass through flanges 140 that extend outwardly from the sides of the stand-off frame 132.

In the arrangement depicted in FIG. 14, the termination blocks 130 are mounted atop each of the stand-off frames 132. The blocks 130 are secured to the frames 132 by means of snap tabs 142 that secure the sides 14 of the platform 12 of the termination block 130 by engaging the rectangular tabs 18 along the sides 14. The snap tabs 142 are provided with a tapered camming surface 142a and a stop face 142b that is directed in an opposite direction. As the platform 12 is pushed downwardly onto the mounting surface 134 of the frame 132, the rectangular tabs 18 engage the camming surface 142a and urge the snap tabs 142 outwardly permitting the tabs 18 to slip past the camming surface 142a. At this point, the tab 18 will be prevented from a reverse movement by engagement of the tab 18 with the stop face 142b.

It is pointed out that, if desired, the stand-off frame 132 may alternatively be omitted and the termination block 130 mounted directly to the wall 114. When this mounting arrangement is used, it is preferred that screws or other connectors be disposed through the slots 24,26 in the connector brackets 20, 22 as such mounting may take advantage of using pre-drilled screw holes used for previously attaching a copper cable punch-down block to the wall 114.

As illustrated in FIG. 14, a portion of the outer sheath 126 is removed from the bundled fiber 124 proximate the securing bracket 122, and the individual fibers 128 are disposed through the apertured sides 136 of the stand-off frames 132. The fibers 128 are run beneath the upper end of the top stand-off frame 132 and then routed to where they are needed. One fiber 128 is shown in FIG. 14 run through one side 136 and then looped upwardly where the affixed connector 144 is inserted into an adapter 146 in the termination block 130. Fibers 128 may also be run down through the column 110 and through the D-ring bracket 116 to an adjacent location (not shown). Excess lengths of optical fiber may be wound around the slack hubs 118.

While the invention has been shown or described in only some of its forms, it should be apparent to those skilled in the art that it is not so limited, but is susceptible to various changes within departing from the scope of the invention.

What is claimed is:

1. A termination block for retaining a plurality of optical fiber connector adapters, comprising:

a base unit having a series of bays for retaining slider panels;

at least one slider panel movably retained within a bay of the base unit, the panel having a retaining portion for retaining an adapter for an optical fiber connector; and the base unit having a lower platform through which connectors can be disposed for affixation of the base unit to a mounting surface.

2. The termination block of claim 1 further comprising a pair of attachment tabs located at opposite corners of the lower platform that are engaged by snap tabs to secure the termination block to a stand-off frame.

3. The termination block of claim 1 wherein the panel comprises a vertically oriented portion having a window therein for receiving an optical fiber adapter.

4. The termination block of claim 3 wherein the panel further comprises a horizontally oriented portion coupled to the vertical portion, the horizontal portion providing a finger lift portion to be contacted by the finger of a user to move the panel with respect to the base unit.

5. The termination block of claim 1 further comprising a removable cover for the base unit.

6. A termination block for receiving a plurality of optical fiber connectors, the block being sized and shaped to present a mounting footprint for replacement of a copper-cable punch-down block, the termination block comprising:

a base platform for attachment to a mounting surface of a stand-off bracket;

a pair of outwardly extending connector brackets that present tabs to receive connectors for attachment of the base platform to the mounting surface; and a slot disposed within the base platform.

7. The termination block of claim 6 further comprising a plurality of brackets affixed to the base platform to define a series of bays to receive slider panels inserted through the slot.

8. The termination block of claim 7 further comprising a removably affixable marker for at least one of said bays.

9. The termination block of claim 6 further comprising a removable cover.

10. The termination block of claim 7 further comprising a slider panel slidingly retained within one of said bays.

11. The termination block of claim 10 further comprising an adapter retained within said slider panel.

12. A method for securing one or more optical fiber connectors in relation to a supporting member, comprising the operations of:

providing a base unit having a plurality of bays for movably retaining slider panels, the base unit further providing a lower platform that extends laterally beyond the bays to provide an attachment member for the base unit;

slidingly inserting a panel into a bay of the base unit;

mounting the base unit upon a support surface;

affixing the attachment member to said support surface by securing the edges of the platform against the support surface;

securing an optical fiber adapter within the panel; and securing an optical fiber connector within the adapter.

13. The method of claim 12 further comprising securing a marker to a portion of the panel.

14. The method of claim 12 wherein the support surface comprises a stand-off frame.

15. The method of claim 12 further comprising the operation of disposing an optical fiber cable having a connector at one end beneath the base unit and bending the cable to align the connector with the adapter.

16. The method of claim 12 further comprising the operation of disposing a removable cover atop the base unit.

17. The method of claim 12 wherein the base unit is mounted within a column of like base units.

18. The method of claim 17 further comprising the operation of mounting a D-ring bracket on the support surface proximate the base unit, the D-ring bracket presenting arcuate contact surfaces that preclude bending of an optical fiber cable beyond its critical bend radius.

19. The method of claim 18 further comprising the operation of mounting a slack hub for receiving excess lengths of optical fiber on the mounting surface proximate the base unit.

20. The method of claim 12 wherein the operation of slidingly inserting the panel into a bay comprises disposing the slider panel beneath the platform and slidingly inserting it upwardly through a slot in the platform and into the bay.

\* \* \* \* \*